United States Patent [19]

Romell et al.

[11] 4,000,064
[45] Dec. 28, 1976

[54] SYSTEM FOR DESTRUCTING WASTE PRODUCTS

[76] Inventors: Gunnar Dag Riss Romell, 10, Ynglingavagen, 182 62 Djursholm; Nils Jörgen Pihl, 14, Ringvagen, 196 30 Kungsangen, both of Sweden

[22] Filed: Dec. 20, 1974

[21] Appl. No.: 535,100

[30] Foreign Application Priority Data

Dec. 20, 1973 Sweden .............................. 7317283

[52] U.S. Cl. ................................ 210/12; 210/180; 210/15
[51] Int. Cl.² ........................................ C02C 1/14
[58] Field of Search ................. 210/12, 15, 18, 14, 210/180, 195, 198, 218, 181

[56] References Cited
UNITED STATES PATENTS

| | | | |
|---|---|---|---|
| 3,338,826 | 8/1967 | Kramer | 210/12 |
| 3,462,275 | 8/1969 | Bellamy | 210/12 |
| 3,607,737 | 9/1971 | Gamer | 210/180 |

*Primary Examiner*—Charles N. Hart
*Assistant Examiner*—Benoit Castel
*Attorney, Agent, or Firm*—Haseltine, Lake & Waters

[57] ABSTRACT

A method for the decomposition of waste material in which the waste material and a stream of air are introduced into a first chamber to initiate the decomposition reaction and thence into at least one additional chamber to complete the reaction. Heated gases produced by the reaction are recycled and brought into heat exchange relation with the incoming air and with the waste material in the first chamber to raise the temperature of the incoming air and waste material to thereby increase the efficiency of the decomposition method. Apparatus includes heat exchange conduit means adapted to conduct the recycled heated reaction gases to the first chamber into heat exchange relation with the waste material therein and into heat exchange relation with the air being introduced to such first chamber.

3 Claims, 1 Drawing Figure

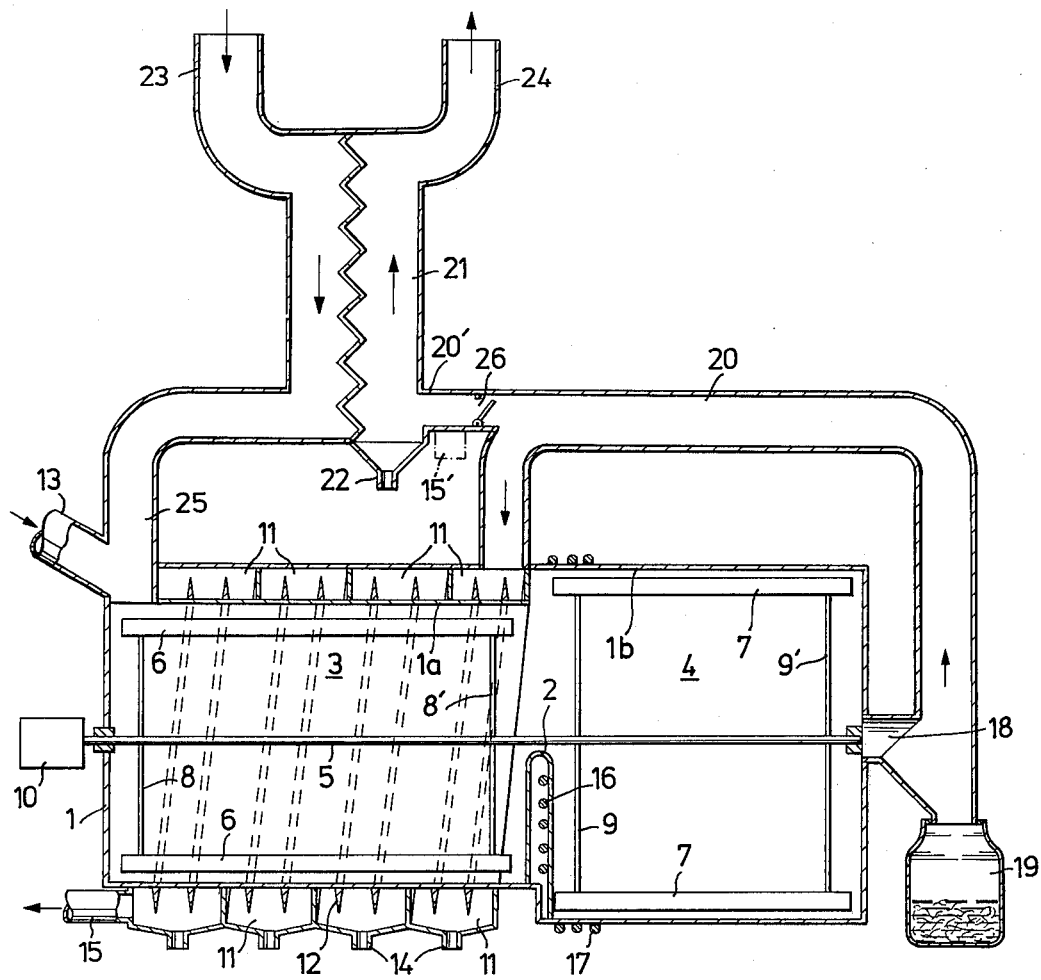

SYSTEM FOR DESTRUCTING WASTE PRODUCTS

It is well known that decaying processes, such as are present for destructing faeces, urine, garbage, and other waste products, proceed considerably much faster at elevated temperatures than at ambient temperatures. Further, it is well known that such processes may be enhanced at elevated temperatures also within comparatively small apparatus and substance volumes, provided that the chamber, within which the decay proceeds, is kept at an elevated temperature by heat supply.

Further, it belongs to prior art as appearing from that the want of external additive heat to the process can be substantially decreased or wholly eliminated by recovering heat from the air stream leaving the decaying zone after having passed the decay chamber and having been heated while supplying oxygen to and taking up carbon dioxide and water vapour in the chamber.

According to the present invention, the characteristic feature of which is that the air leaving the decay process and brought to an elevated temperature by heat generated during the process is transported past a heat transfer surface of a heat exchange apparatus, a heat transfer surface of a second chamber of which is in immediate contact with the goods treated in the system for decaying, is to still improve the yield of heat of the process.

When putting the invention into effect, the recovery of heat from the air outflow, and the decay process as such therewith, can be rendered more effective and in a favourable manner be adapted for expelling larger quantities of liquid than the ones hitherto taken care of in apparatuses of this kind. This is provided for by utilizing a process known as such from the Swedish Pat. No. 358,145 by transfer of heat from the hot and moist air outflow to the organic substances with which the decay system is being charged and which is present in the decay chamber of the system, or which, without as yet having entered the range of the system in which the most intensive decay takes place, resides in a container of the system as introduced therein from outside, from a sparingly flushing toilet, for instance.

The invention will be more extensively described in the following in connection with an embodiment thereof shown in the accompanying drawing, said drawing schematically showing a decay system according to the invention.

The system comprises a waste material treatment container 1 having a generally cylindrical envelope, as illustrated comprising two parts 1a and 1b, respectively, enclosing a chamber. Said chamber is, as illustrated, sub-divided by a partition wall 2 in two parts, a first part 3 as seen in the direction of motion of the goods through the container when treated, and a second part 4. The apparatus comprises a stirrer located within the chamber and consisting of a motor 10 driven shaft 5 carrying stirring vanes 6 and 7, secured to the shaft by means of spokes 8, 8' and 9, 9', respectively.

For utilizing heat present in the flow of air heated by the decay process before leaving the decay zones of the system, the apparatus comprises an air channel 11 helically surrounding chamber 3 and together with the portion 1a of the envelope 1 surrounding part 3 of the apparatus constitutes a heat exchanger between air passing through channel 11 on one side and, on the other, the goods residing in the chamber part 3 as well as the fresh air which enters from outside through a fresh air intake 25 and which, after acceptance of heat through part 1a of the envelope from air leaving chamber 4 transfers heat to the goods within the chamber while said goods is exposed to a stirring action. The heat transfer surface between the air leaving the decay zone and the envelope is enhanced by heat conducting flanges 12 of the envelope. To diminish the heat losses to ambient atmosphere, the apparatus comprises a heat insulation, not shown on the drawing.

Faeces and/or other decomposable organic material is introduced into the container 1 through an inlet duct 13. While exposed to treatment in the apparatus, the goods proceeds slowly to the right, as seen on the drawing, in the first part 3 of the chamber while being heated by means of air leaving the chamber through the channel 11, said air being, when entering the channel, at a considerably much higher temperature level than the material present in chamber 3. The heat transport from the hot decay air to the goods under treatment is, consequently, provided for in part by mediation of supplied fresh air heated by contact with the uppermost wall portions of the envelope, in part, and this is of specific significance for the invention in economizing the process, by immediate contact between the goods under treatment and the envelope wall surrounded by channel 11. Due to the immediate and thus intimate contact between the goods under treatment within the chamber and the envelope, and the likewise intimate contact between the envelope walls and the air leaving the decay zone, the total quantity of heat present in the decay air that can be recovered and utilized to render the decay process more effective, will be many times larger than possible when the fresh air only is heated by intersection between fresh air and decay air to recover heat.

During this heating procedure, water introduced together with waste products or otherwise is expelled by evaporation, such evaporation being enhanced by the stirring provided for by vanes 6. The evaporation heat corresponds to the condensation heat of the vapour simultaneously condensing in the air channel 11 and collected as condensate from the channel by water outlets 14.

The cooled decay air, which is thus substantially freed from its content of moisture, leaves channel 11 through a duct 15.

The heated and partly dehumidized material enters the second portion 4 of the chamber while passing the partition 2, the most effective decay of the goods introduced into the system proceeding there under considerable generation of heat. In order rapidly to increase the temperature of the goods to a temperature favourable for the decaying process, when starting the system in particular, the partition wall 2 and the part of the portion 4 of the chamber adjacent wall 2 may, as illustrated, be equipped with external heat supply means 16 and 17, respectively. Partition wall 2 may, as a matter of convenience, comprise a heat insulation arranged so that heat supplied by heating means 16 will mainly be transferred the goods entering chamber portion 4 from chamber portion 3. After finished decay, the goods is expelled from the chamber, actuated by vanes 7, through an outlet port 18 to be received by a container 19. At the exit end of chamber portion 4 and, for instance, as shown on the drawing, through the same outlet port 18 as the goods, the decay air flows out of the container at elevated temperature. This outflow of hot and moist air flows via a duct 20 into the heat exchange channel 11 to deliver the major part of available heat content during decrease of temperature and condensing-out of vapour.

In the embodiment as illustrated on the drawing, means are present to conduct part of the decay air flow, as the case may be, past a controllable valve device 26, to a heat exchanger 21 for transferring part of the heat present in the hot air leaving the system at a higher temperature level than the one prevailing at the intake 25 of fresh air in the transfer of heat from air which has already passed the major part of channel 11 when transferring heat to fresh air entering through channel 25. By such means, the fresh air temperature is increased from ambient temperature already before being introduced into the chamber part 3. The heat exchanger 21 suitably as well comprises a means 22 for collecting condensate. Cooled fresh air entering from outside through duct 23 is thus heated by heat exchange in the exchanger 21 and then conducted into the first chamber part 3 through duct 25. As indicated at 15' in duct 20' between duct 20 and the warm air part of heat exchanger 21 after valve 26, the outlet duct 15 of the heat exchange channel 11 may, alternatively, be connected to the warm air part of heat exchanger 21 to further utilize heat of air leaving the system, in particular when ambient air temperature is at a comparatively low level.

The embodiment illustrated by the drawing is only to be considered as exemplifying the principle of the invention. In practice, the same principle may be utilized in different manner. So, for instance, the stirring of the material may be provided for by rotating chamber 3 or 4 or both, in which case their respective inlet and outlet ports are arranged substantially concentric with the rotational axis. Further, the heat transfer from the hot air leaving the decay zone to the goods present in the chamber may be provided for by means of a heat pump or circulating water system.

We claim:

1. In a method of rendering a decay process for largely moist-particulate organic waste more effective comprising introducing waste products into a first decaying zone of a container surrounded by a cylindrical envelope having a first and a second zone for decaying waste products at temperatures above ambient, supplying air to said first decaying zone so as to provide the necessary oxygen to maintain an exothermic decaying process in said first zone and in said second zone; removing the resulting vaporous decay atmosphere of said first zone and decaying waste products from the first zone after having been elevated to above ambient temperature by the heat generated by said exothermic process; passing said decay atmosphere together with said waste products into said second zone for furthering the decay of the waste products; removing the resulting vaporous decay atmosphere and decayed solid waste from the second zone and separating said resulting decay atmosphere and said decayed solid waste, the improvement consisting of passing said separated decay atmosphere after having thus been elevated to above ambient temperature by the heat generated in said decaying process into intimate heat transfer contact with the waste products introduced into the first zone and the entering air through a heat exchange surface surrounding the first zone in which the decaying process is conducted.

2. In a method according to claim 1, where the decay atmosphere after having brought to above ambient temperature is additionally passed along in a direct heat exchange relationship to raise the temperature of the incoming air prior to being introduced into the first zone.

3. Apparatus for providing decaying of moist organic waste products, including a container for introducing waste products, said container having a generally cylindrical envelope comprising a first zone for exposing said products to a decay process at above ambient temperature; a second zone for conducting the decay process further with both zones equipped with stirring means for moving said waste products through said zones; means for supplying air to said first zone so as to provide gaseous oxygen for maintaining an exothermic decaying process in said zones converting said air into a vaporous decay atmosphere of elevated temperature; means for removing said decay atmosphere from said second zone after having been elevated to above ambient temperature by said exothermic process; means for passing said heated decay atmosphere into a heat exchange chamber disposed as said envelope around said first zone, said first zone having heat exchange means including fins adapted to be put in intimate thermal contact with said heated decay atmosphere and additional heat exchange means located in a duct for heating fresh air prior to entry into the first zone by the heated decay atmosphere passing from said decaying zone to ambient atmosphere.

* * * * *